United States Patent
Dzik et al.

(10) Patent No.: US 9,479,846 B2
(45) Date of Patent: *Oct. 25, 2016

(54) LOW COMPLEXITY TONE/VOICE DISCRIMINATION METHOD USING A RISING EDGE OF A FREQUENCY POWER ENVELOPE

(71) Applicant: Intel Corporation, Santa Clara, CA (US)

(72) Inventors: Dariusz Dzik, Allentown, PA (US); Bahman Barazesh, Flemington, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,611

(22) Filed: Aug. 31, 2015

(65) Prior Publication Data
US 2015/0373429 A1 Dec. 24, 2015

Related U.S. Application Data

(63) Continuation of application No. 14/136,203, filed on Dec. 20, 2013, now Pat. No. 9,148,520.

(60) Provisional application No. 61/913,525, filed on Dec. 9, 2013.

(51) Int. Cl.
| H04M 1/00 | (2006.01) |
| H04Q 1/46 | (2006.01) |
| H04M 7/12 | (2006.01) |
| H04Q 1/457 | (2006.01) |
| H04M 1/24 | (2006.01) |
| H04M 11/06 | (2006.01) |

(52) U.S. Cl.
CPC .............. *H04Q 1/46* (2013.01); *H04M 1/24* (2013.01); *H04M 7/1295* (2013.01); *H04M 11/06* (2013.01); *H04Q 1/457* (2013.01); *H04M 2203/2027* (2013.01)

(58) Field of Classification Search
CPC .............. H04M 7/1295; H04M 2203/2027; H04Q 1/457
See application file for complete search history.

(56) References Cited

U.S. PATENT DOCUMENTS

| 6,128,370 | A | 10/2000 | Barazesh et al. |
| 6,192,226 | B1 | 2/2001 | Fang |
| 6,199,036 | B1 | 3/2001 | Ahmadi |
| 6,868,116 | B2 | 3/2005 | Ahmad |
| 8,050,397 | B1 | 11/2011 | Read |
| 8,340,964 | B2 | 12/2012 | Konchitsky et al. |
| 2003/0086444 | A1 | 5/2003 | Randmaa et al. |
| 2010/0232228 | A1 | 9/2010 | Jeon et al. |
| 2011/0046965 | A1 | 2/2011 | Taleb et al. |
| 2011/0116497 | A1 | 5/2011 | Bolocan |

OTHER PUBLICATIONS

Notice of Allowance mailed May 21, 2015 for U.S. Appl. No. 14/136,203.

*Primary Examiner* — Creighton Smith
(74) *Attorney, Agent, or Firm* — Green, Howard & Mughal LLP

(57) ABSTRACT

An apparatus comprising a decision circuit, a detector circuit and a processing circuit. The decision circuit may be configured to generate a confirmation signal in response to a first lock signal and a second lock signal. The detector circuit may be configured to generate the first lock signal in response to a filtered version of an input signal being above a threshold. The processing circuit may be configured to generate the second lock signal in response to a power signal received from the detector circuit. The processing circuit generates the second lock signal by analyzing the rising edge of a frequency power envelope of the power signal.

20 Claims, 7 Drawing Sheets

LOW COMPLEXITY TONE/VOICE DISCRIMINATION METHOD USING A RISING EDGE OF A FREQUENCY POWER ENVELOPE

CLAIM FOR PRIORITY

This application is a continuation of U.S. patent application Ser. No. 14/136,203, filed on 20 Dec. 2013, titled "LOW COMPLEXITY TONE/VOICE DISCRIMINATION METHOD USING A RISING EDGE OF A FREQUENCY POWER ENVELOPE", which claims priority to U.S. Provisional Patent Application Ser. No. 61/913,525, filed 9 Dec. 2013, and which are incorporated herein by reference in their entirety for all purposes.

FIELD OF THE INVENTION

The invention relates to communications systems generally and, more particularly, to a method and/or apparatus for implementing a low complexity tone/voice discrimination method using a rising edge of a frequency power envelope.

BACKGROUND

Accurate detection of tones in telecommunication systems is an important part of a conventional communication channel. Tones are used by conventional telecom equipment to signal and/or exchange data. Tones can be (i) single frequency, (ii) multiple frequency, (iii) modulated, and (iv) periodic cadence. Conventional communication channels often need to switch between voice and data communication modes. The data and/or signaling tone detection is done by the tone detectors. Tone detection should be accurate and should include false detection prevention. Conventional approaches to detection of a specific tone frequency have used a Fourier Transform algorithm or a variation like Fast Fourier Transform (FFT) algorithm. Another conventional algorithm used is a Goertzel filter, which has the advantage of a fast execution for specific frequency and low memory requirements.

SUMMARY

The invention concerns an apparatus comprising a decision circuit, a detector circuit and a processing circuit. The decision circuit may be configured to generate a confirmation signal in response to a first lock signal and a second lock signal. The detector circuit may be configured to generate the first lock signal in response to a filtered version of an input signal being above a threshold. The processing circuit may be configured to generate the second lock signal in response to a power signal received from the detector circuit. The processing circuit generates the second lock signal by analyzing the rising edge of a frequency power envelope of the power signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention may provide frequency detection as well as additional verification for modulation or an on-off period. Such additional verifications provide improved robustness against false detection in the presence of voice or music. Embodiments of the invention include providing a low complexity tone/voice discrimination method that may (i) use a rising edge of frequency power envelope, (ii) be efficient to implement, (iii) adapt to an existing tone detection system, and/or (iv) be implemented as one or more integrated circuits.

Embodiments of the invention may include a low complexity system for preventing false interpretation of voice, music, noise, etc. as valid communication tones. Another embodiment of the invention includes a high efficiency implementation for preventing false tone detection. Preventing false tone detection may be implemented by exploring the differences between voice and or music versus a signaling tone. Such differences may be (i) significant amplitude level fluctuation of a voice signal, (ii) frequency instability of a voice signal and (iii) frequency band differences between voice and signaling tones.

Frequency power estimation may be used to analyze a rising edge of a signal power envelope for a particular tone frequency. The human voice does not generally change significantly in a narrow frequency band within a short observation window. Tones generated using communication equipment tend to have large per frequency power changes at the beginning of the tone. Such changes may be used to prevent a false lock condition.

Figure 1:
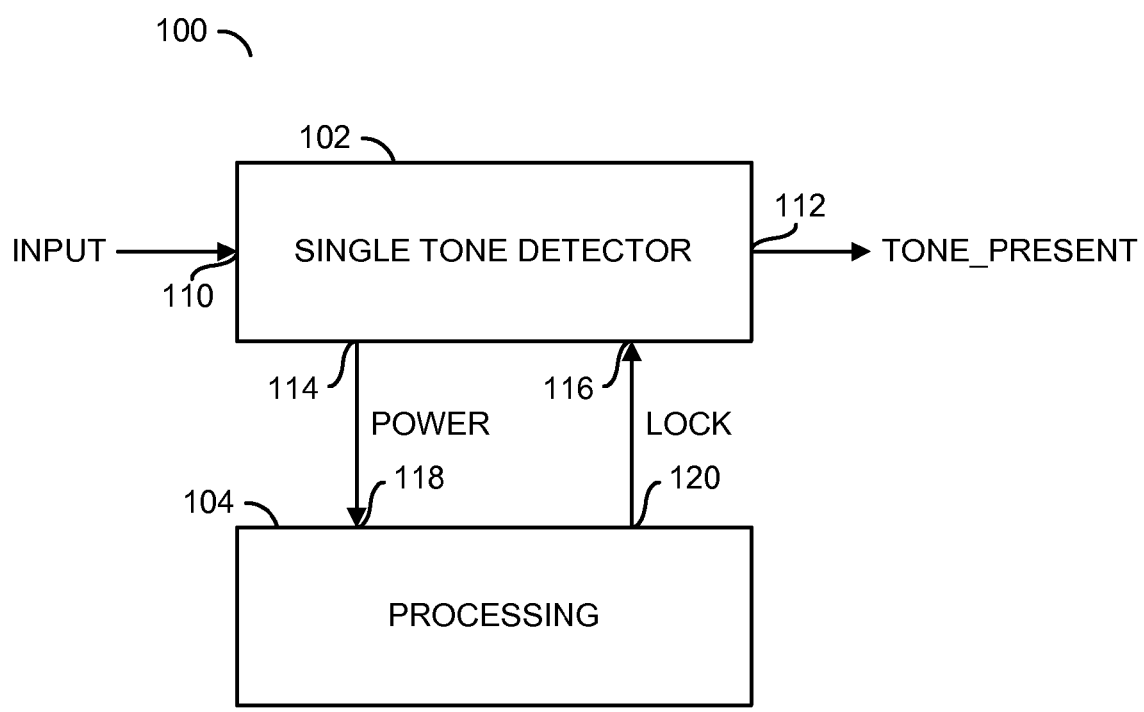
FIG. 1 is a block diagram of an example implementation of an embodiment.

Referring to FIG. 1, a block diagram of circuit 100 is shown in accordance with an embodiment of the invention. The circuit 100 generally comprises a block (or circuit) 102, and a block (or circuit) 104. The circuit 102 may be implemented as a single tone detector. The circuit 104 may be implemented as a processing circuit. The circuit 102 may have an input 110 that may receive a signal (e.g., INPUT), an output 112 that may present a signal (e.g., TONE_PRESENT), an output 114 that may present a signal (e.g., POWER), and an input 116 that may receive a signal (e.g., LOCK2). The circuit 104 may have an input 118 that may receive the signal POWER, and an output 120 that may present the signal LOCK2.

Figure 2:
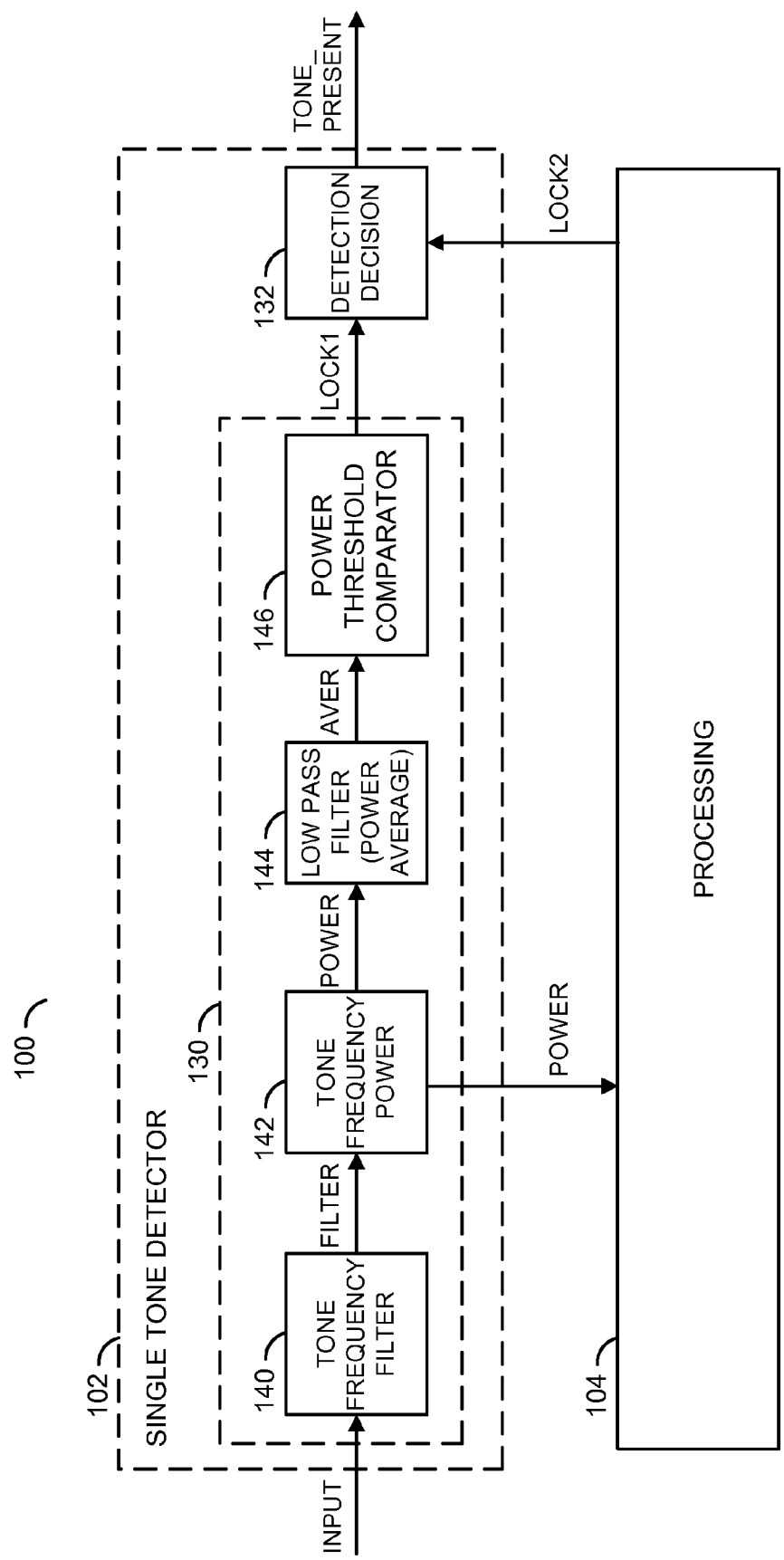
FIG. 2 is a more detailed diagram of an embodiment.

Referring to FIG. 2, a more detailed diagram of the circuit 102 is shown. The circuit 102 generally comprises a block (or circuit) 130, and a block (or circuit) 132. The circuit 130 generally comprises a block (or circuit) 142, a block (or circuit) 144, and a block (or circuit) 146. The circuit 130 may be implemented as a tone detector. The circuit 132 may be implemented as a detection decision circuit. The circuit 140 may be implemented as a tone frequency filter circuit. The circuit 142 may be implemented as a tone frequency power circuit. The circuit 144 may be implemented as a low pass filter configured to calculate an average power of the signal POWER. The circuit 144 may generate a signal (e.g., AVER). The circuit 146 may wait until the power of the signal AVER is greater than a predetermined threshold. The circuit 146 may generate a signal (e.g., LOCK1).

The detection decision circuit 132 may determine a condition of the signal TONE_PRESENT by evaluating the signal LOCK1, LOCK2 and/or DETECT_TIME. The signal TONE_PRESENT may be either a logic 1 or a logic 0. The signal TONE_PRESENT may be a logic 1 when the signal LOCK1, the signal LOCK2 and the signal DETECT_TIME are a logic high as shown by the following TABLE 1:

TABLE 1

| LOCK1 | LOCK2 | DETECT_TIME | TONE_PRESENT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

The following TABLE 2 describes conditions when the signal LOCK1 is a logic high without the analysis of the signal LOCK2. In the example shown, when the signal LOCK1 and the signal DETECT_TIME are both a logic 1, the signal TONE_PRESENT is shown as a logic high. Without the analysis of the signal LOCK2, the signal TONE_PRESENT may indicate a false lock.

TABLE 2

| LOCK1 | DETECT_TIME | TONE_PRESENT |
|---|---|---|
| 0 | 0 | 0 |
| 0 | 1 | 0 |
| 1 | 0 | 0 |
| 1 | 1 | 1 |

Figure 3:
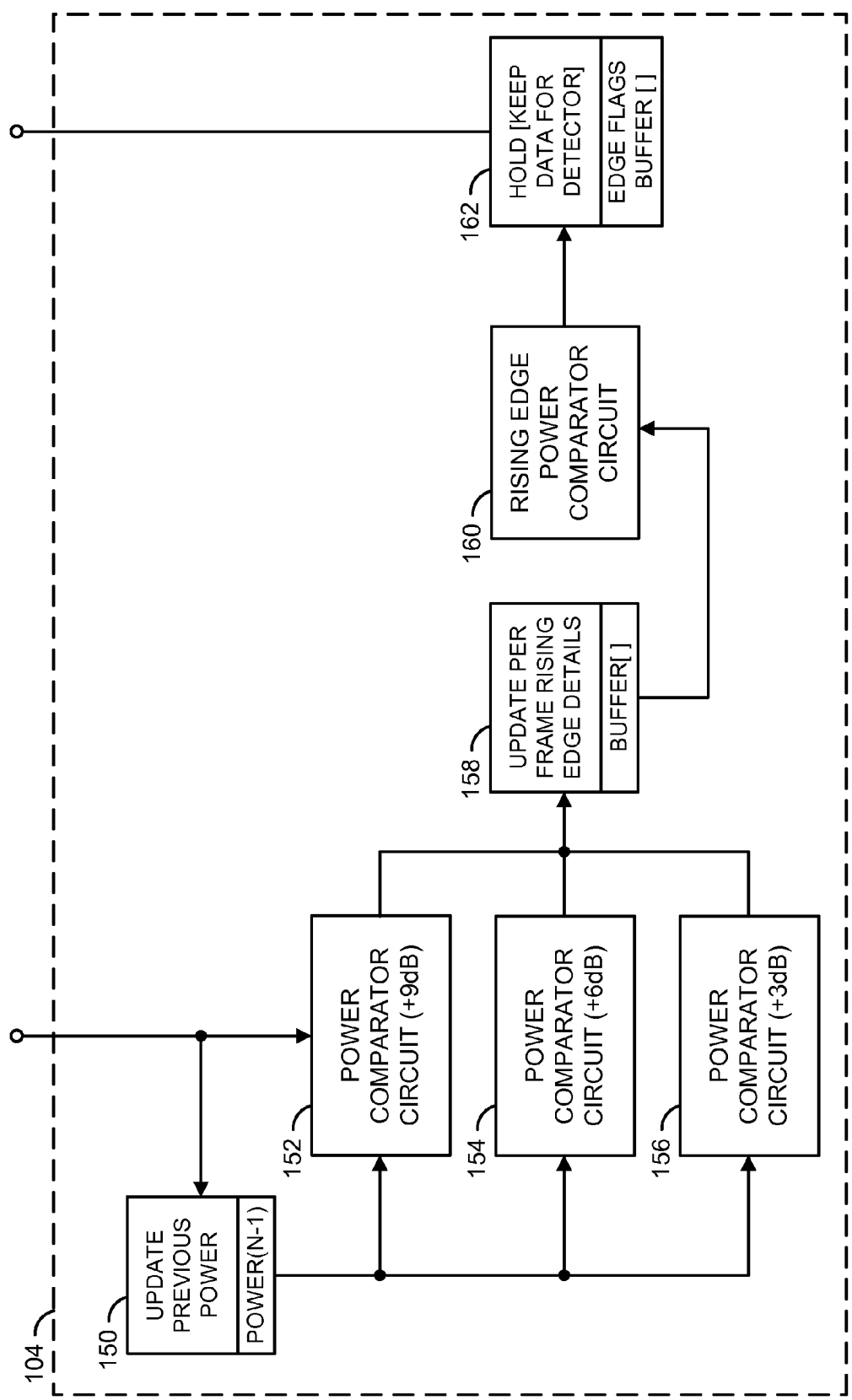
FIG. 3 is a more detailed diagram of the processing circuit.

Referring to FIG. 3, a more detailed diagram of the processing circuit 104 is shown. The processing circuit generally comprises a block (or circuit) 150, a block (or circuit) 152, a block (or circuit) 154, a block (or circuit) 156, a block (or circuit) 158, a block (or circuit) 160 and a block (or circuit) 162. The circuit 150, the circuit 158 and/or the circuit 162 may be implemented as tables configured to buffer data.

The circuit 100 may be more efficient in some cases when compared with only analyzing the total power transient. The circuit 100 may more closely track a real tone narrow band rising power. For example, with the circuit 100, other frequency influences normally encountered in a traditional total power transient analysis may be reduced and/or eliminated.

The prevention of false tone detections can reach 40 to 90% based on performance testing using music, voice, noise, whistle samples, etc. In one implementation, at least two consecutive frequency power estimation windows may be used. For example, around 0.010 to 0.030 seconds may be used for a frequency power rising edge for analyzing windows of 0.005 to 0.015 seconds. For a 0.005 second window, when analyzing a very noisy signal INPUT, another one or two 0.005 second windows may be included in the calculation to improve performance for the pure tones. In the 0.010 to 0.030 second interval, a power gain of at least 9 dB per frequency for signaling tones may be achieved. Anything less than 9 dB may be considered to not be a signaling tone. The frequency power rising edge details (or parameters) may be held until the tone detector makes a decision on the presence of the tone based on frequency level.

The signal INPUT generally represents one processing window (e.g., 0.005 to 0.015 seconds of signal samples). The tone detector 102 filters the signal INPUT through the filter 140 to generate a signal FILTER. In one example, the filter 140 may be implemented as a narrow band pass filter (e.g., Goertzel filter). However, other filters may be implemented to meet the design criteria of a particular implementation. The circuit 142 may calculate the power of the filtered signal FILTER to generate the signal POWER. The circuit 144 may calculate a long term average of the signal POWER to generate a signal (e.g., AVER) by applying a low pass filter to the signal POWER (e.g., the component) of signal FILTER. If the value from the circuit 144 exceeds a specified threshold, the decision circuit 146 determines that the single frequency tone detector 102 can declare the tone to be activated by generating a signal (e.g., TONE_PRESENT).

A current value of the signal POWER may be compared to a previous value of the signal POWER from a previous processing window stored in the circuit 150. The comparator circuit 152, the comparator circuit 154 and/or the comparator circuit 156 may be used to perform the comparison. In one implementation, a decision of whether the new value of the signal POWER is greater than a previous value of the signal POWER (stored in the circuit 150) by at least 9 dB (8.times.) is made by the comparator circuit 152. A decision of whether the new value of the signal POWER is greater than a previous value of the signal POWER (stored in the circuit 150) by at least 6 dB (4.times.) is made by the comparator circuit 154. A decision of whether the new value of the signal POWER is greater than a previous value of the signal POWER (stored in the circuit 150) by at least 3 dB (2.times.) is made by the comparator circuit 156. The comparator circuits 152, 154, and/or 156 may generate a decision data signal as output. The decision data signals from the comparator circuits 152, 154 and/or 156 are kept in the buffer 158. While the present example implements three comparator circuits with decision data signals generated in response to comparisons of 9 dB, 6 dB, and 3 dB the number of comparators and/or the comparison values may be varied to meet the design criteria of a particular implementation.

The decision data signals generated by the comparator circuits 152, 154, and/or 156 may be stored as decision data in the buffer 158. Generally, decision data is stored in the order the buffer 158 receives the decision data signals. As new decision data is added to the buffer 158, previously stored decision data is shifted back by one position. In one implementation, new decision data signals may be generated by the comparator circuits 152, 154, and/or 156 every 0.010 seconds and each position in the buffer 158 would correspond to a 0.010 second interval. Various implementations may be used having indices pointing to the latest and oldest positions in the buffer 158 with no shifting required. The comparator circuit 160 may then process the most recent 2 to 4 values (e.g., the signal POWER from 2 to 4 time windows, which corresponds to 0.010 to 0.030 seconds).

In one implementation, if the comparator circuit 160 determines a 9 dB (8.times.) rising power in the buffer 158 in the recent 2 to 4 windows, the comparator circuit 160 generates a signal (e.g., YES) presented to follow block 162. The block 162 holds the frequency power rising edge decision and generates the signal LOCK2 for the tone detector for 0.100 to 0.300 seconds. The block 150 updates the previous value of the signal POWER using the current power value in preparation for the next following window data. The buffer 158 may clear decision data over time if there are no decision data signals indicating an energy rise. When the buffer 158 has no decision data stored, the signal LOCK2 will return to logical low and tone detection may be disabled until another energy rise is detected.

Referring to FIGS. 4-10, diagrams of example plots of various frequency power waveforms are shown. FIGS. 4-10 illustrate analysis of the signal power for an example waveform. The signal LOCK1 (not shown) may be considered logical high in the various example plots. In such an example, the circuit 130 would generate a lock condition for the signal TONE_PRESENT if the analysis provided by the processing circuit 104 is not used. The Y-axis of the graphs may represent the power of the signals measured in dBm. The X-axis of the graphs may represent time measured in milliseconds. The solid line 200 represents the signal POWER. The dash line 202 represents the signal LOCK2. The line 204 represents the signal DETECT_TIME. The line 204 may represent a time when an event occurs. In general, the event DETECT_TIME may be determined by the single tone detector 102. The occurrence of the event DETECT_TIME may vary depending on the signaling tone and the applicable standard for the signaling tone. In the example shown, the signal LOCK2 may be considered logical high at around +9 dBm and may be considered logical low at around 0 dBm. Other levels for a logical high and a logical low may be implemented to meet the design criteria of a particular implementation. Generally, if the signal LOCK2 is a logical high when the event time DETECT_TIME occurs, then the output 112 may present a logical high on the signal TONE_PRESENT. If the signal LOCK2 is logical low when the event time DETECT_TIME occurs, then the output 112 may present a logical low onto the signal TONE_PRESENT.

Referring to FIGS. 4-7, diagrams of example plots of whistle and whistle-like singing samples are shown. These samples may represent tone-like signals. Tone-like signals may have the average frequency power for the circuit 130 to provide the signal LOCK1. However, a detection for tone-like signals would be a false detection. Tone-like signals do not have the clear rising frequency power. Generally, the frequency power of speech and whistle signals fluctuate, but do not appear suddenly as is the case with signaling tones. Music samples may, in theory, create pure tones (like signaling tones) for some instruments but would also be considered a false detection.

Figure 4:
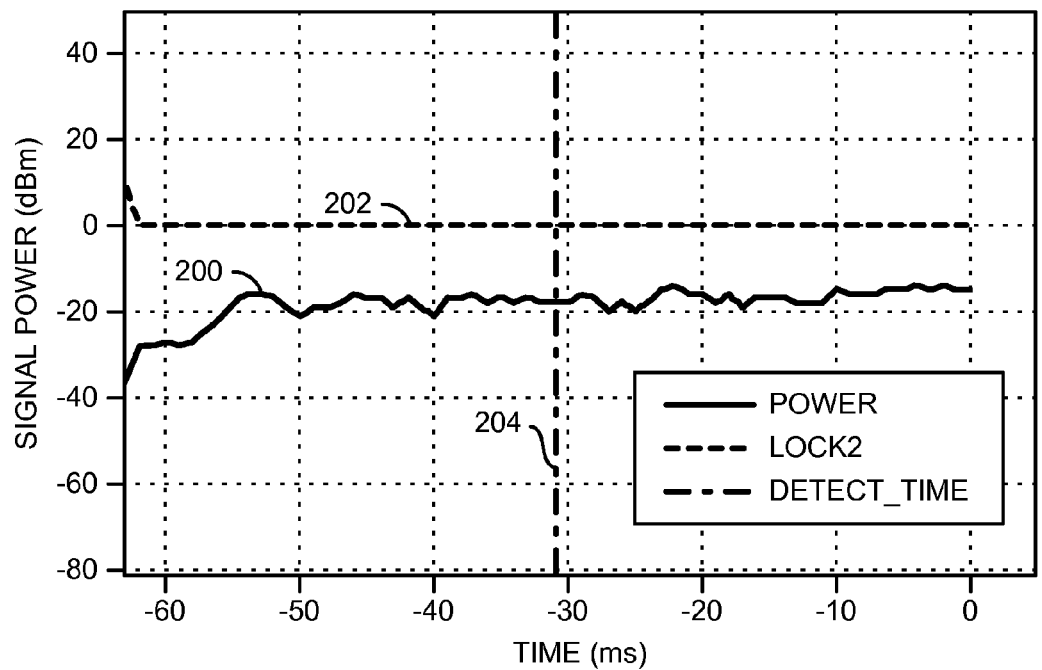
FIGS. 4-10 are diagrams of plots of various waveforms.

Referring to FIG. 4, an example plot of a frequency power waveform representing a false tone is shown. The line 200 represents a waveform being analyzed near the event DETECT_TIME. In the example shown, the circuit 130 may present a false detection on the signal LOCK1. However, when the signal LOCK2 remains at logical low at the event time DETECT_TIME, the potential false detection is avoided. The signal LOCK2 remains low during the event DETECT_TIME due to the analysis of the signal POWER performed by the processing circuit 104. The signal LOCK2 is shown transitioning from a logical high to a logical low around −62 milliseconds. The high-to-low transition is generated roughly in response to a rapid change of the edge of the signal POWER when the change does not last long enough to be considered a signaling tone.

Figure 5:
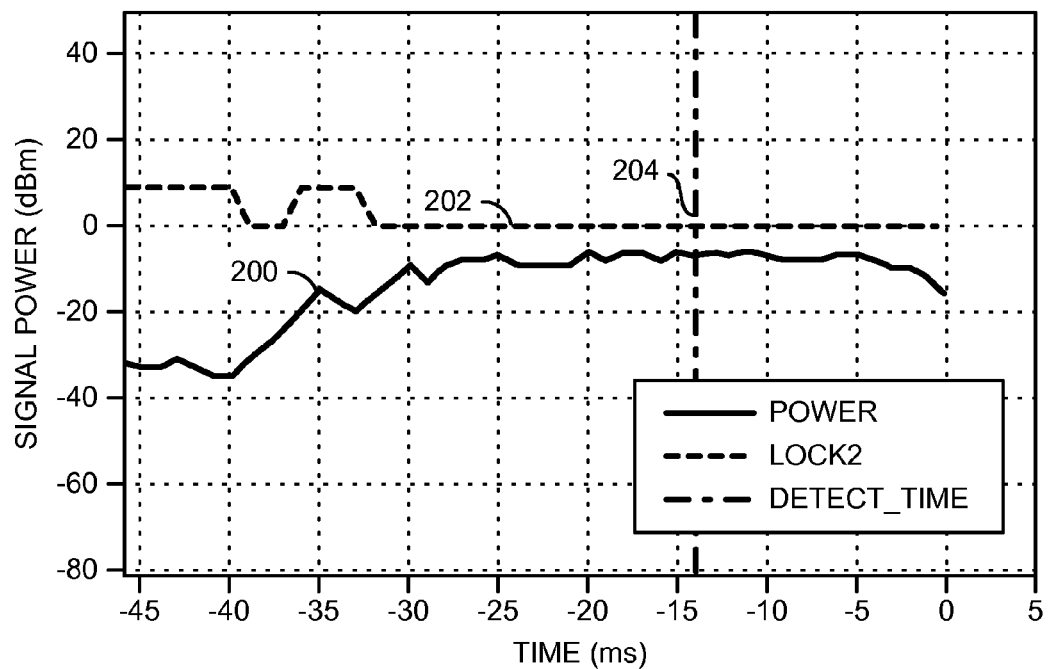

Referring to FIG. 5, an example plot of a frequency power waveform representing a false tone is shown. The line 200 represents a waveform being analyzed near the event DETECT_TIME. In the example shown, the circuit 130 may present a false detection on the signal LOCK1. The signal LOCK2 presents a logical high before the event time DETECT_TIME. However, the signal LOCK2 returns to logical low at the event time DETECT_TIME and the potential false detection is avoided. The signal. LOCK2 remains low during the event DETECT_TIME due to the analysis of the signal POWER performed by the processing circuit 104. The signal LOCK2 is shown transitioning from logical low to logical high around −36 milliseconds. The low-to-high transitions occur roughly in response to the rapid change of the edge of the signal POWER. The signal LOCK2 is shown transitioning from a logical high to a logical low around −40 milliseconds and −33 milliseconds. The high-to-low transition is generated roughly in response to a rapid change of the edge of the signal POWER when the change does not last long enough to be considered a signaling tone.

Figure 6:
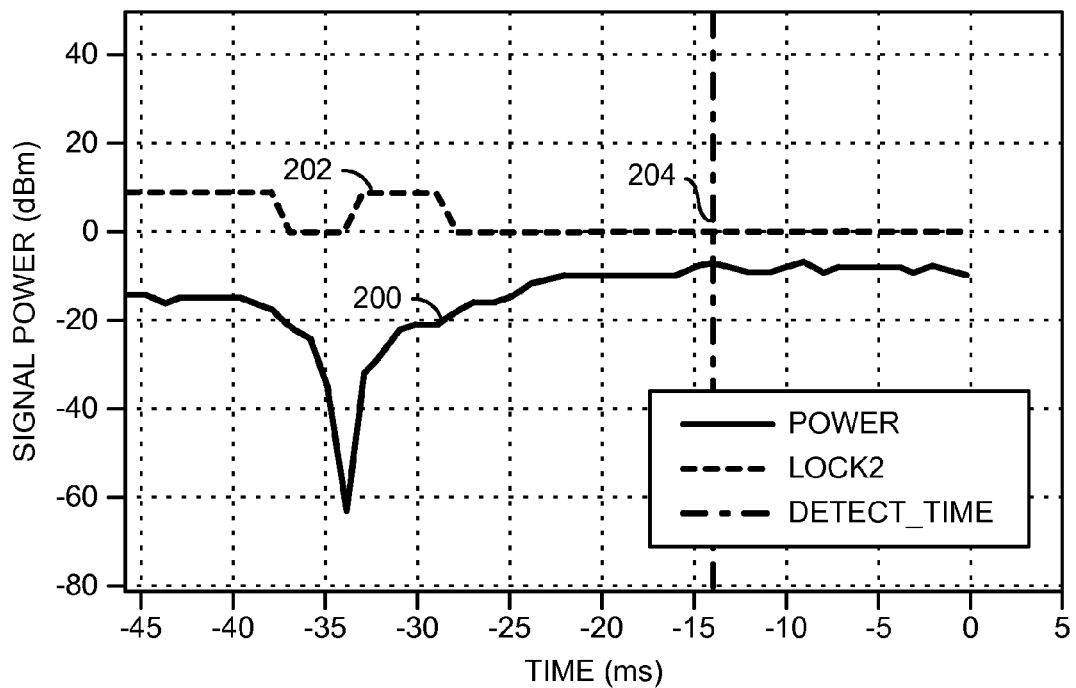

Referring to FIG. 6, an example plot of a frequency power waveform representing a false tone is shown. The line 200 represents a waveform being analyzed near the event DETECT_TIME. In the example shown, the circuit 130 may present a false detection on the signal LOCK1. The signal LOCK2 presents a logical high before the event time DETECT_TIME. However, the signal LOCK2 returns to logical low at the event time DETECT_TIME and the potential false detection is avoided. The signal LOCK2 remains low during the event DETECT_TIME due to the analysis of the signal POWER performed by the processing circuit 104. The signal LOCK2 is shown transitioning from logical low to logical high around −33 milliseconds. The low-to-high transitions occur roughly in response to the rapid change of the edge of the signal POWER. The signal LOCK2 is shown transitioning from a logical high to a logical low around −37 milliseconds and −29 milliseconds. The high-to-low transition is generated roughly in response to a rapid change of the edge of the signal POWER when the change does not last long enough to be considered a signaling tone.

Figure 7:
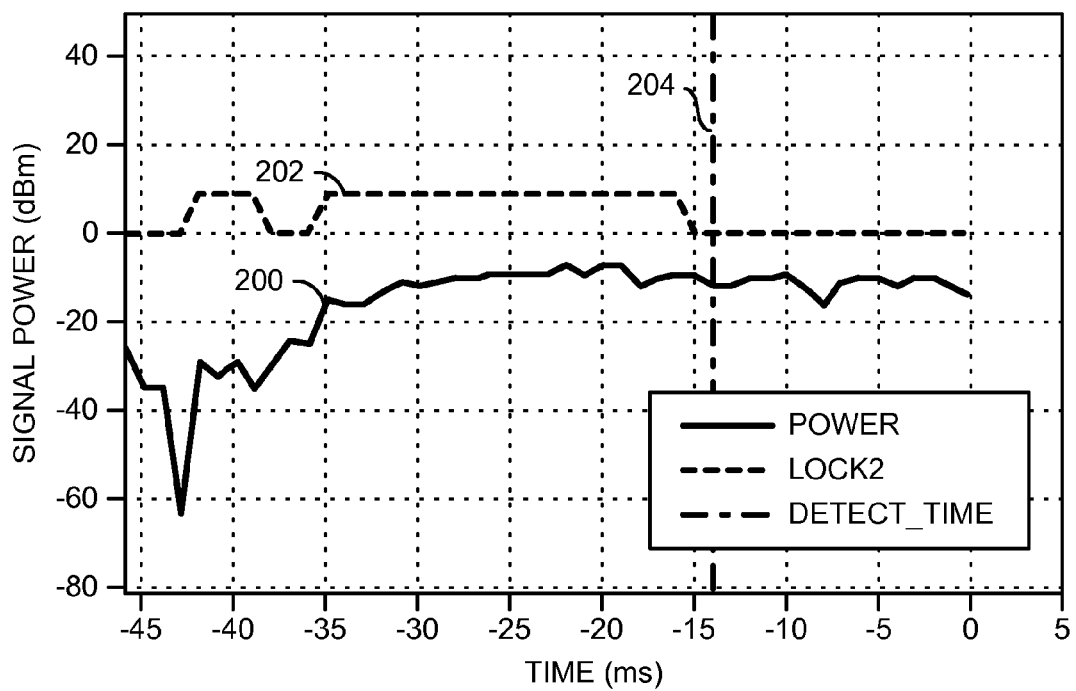

Referring to FIG. 7, an example plot of a frequency power waveform representing a false tone is shown. The line 200 represents a waveform being analyzed near the event DETECT_TIME. In the example shown, the circuit 130 may present a false detection on the signal LOCK1. The signal LOCK2 presents a logical high before the event time DETECT_TIME. However, the signal LOCK2 returns to logical low at the event time DETECT_TIME and the potential false detection is avoided. The signal LOCK2 remains low during the event DETECT_TIME due to the analysis of the signal POWER performed by the processing circuit 104. The signal LOCK2 is shown transitioning from logical low to logical high around −43 milliseconds and −35 milliseconds. The low-to-high transitions occur roughly in response to the rapid change of the edge of the signal POWER. The signal LOCK2 is shown transitioning from a logical high to a logical low around −39 milliseconds and −16 milliseconds. The high-to-low transition is generated roughly in response to a rapid change of the edge of the signal POWER when the change does not last long enough to be considered a signaling tone.

Figure 8:
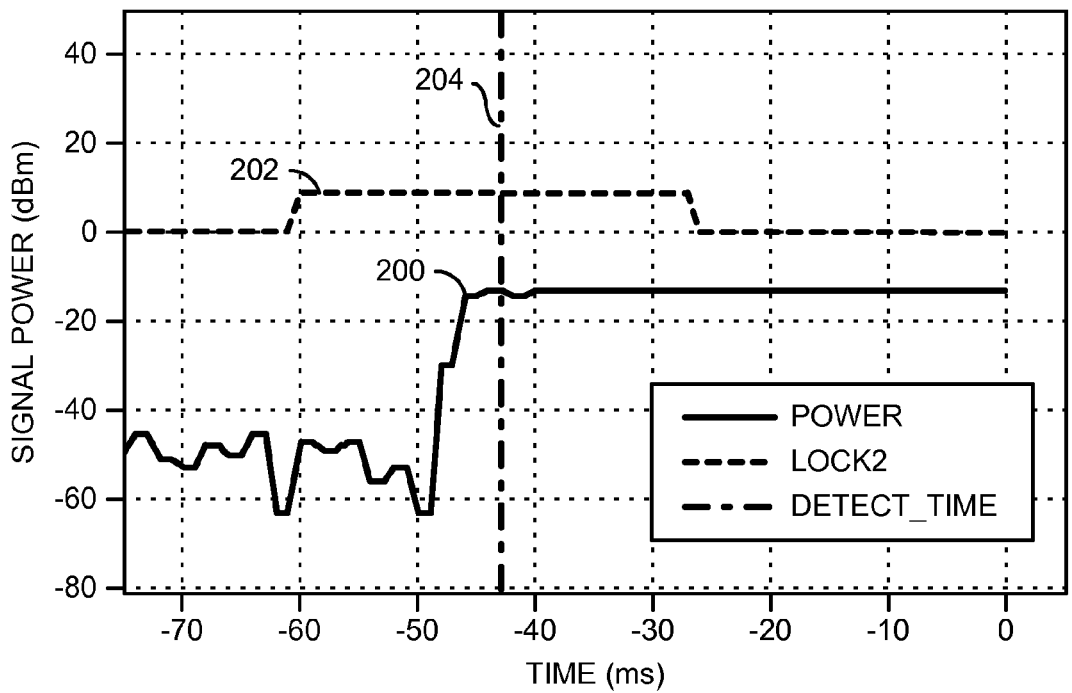

Referring to FIG. 8, an example plot of a frequency power waveform representing a real tone is shown. The line 200 represents a waveform being analyzed near the event DETECT_TIME. In the example shown, the circuit 130 may present a correct detection on the signal LOCK1. The signal LOCK2 also presents a logical high at the event time DETECT_TIME. A proper detection may occur by presenting the signal TONE_PRESENT at the output 112. The signal LOCK2 is shown transitioning from logical low to logical high around the −60 milliseconds. The low-to-high transitions occur roughly in response to the rapid change of the edge of the signal POWER. The signal LOCK2 is shown transitioning from a logical high to a logical low around −29 milliseconds. The high-to-low transition is generated roughly in response to a rapid change of the edge of the signal POWER when the change does not last long enough to be considered a signaling tone.

Figure 9:
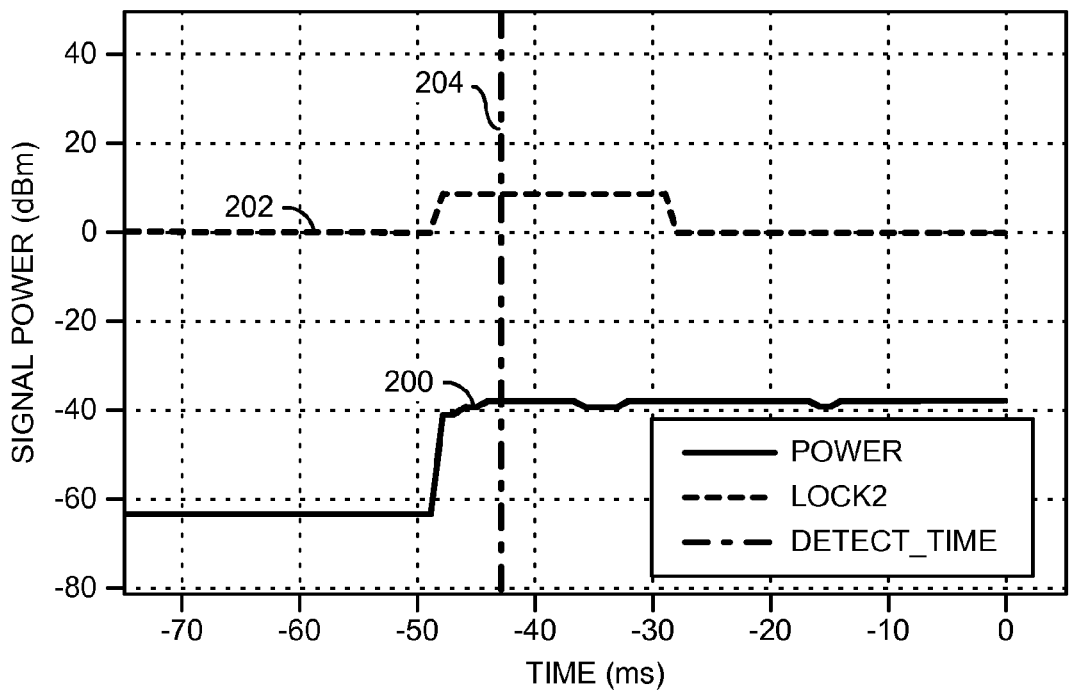

Referring to FIG. 9, an example plot of a frequency power waveform representing a real tone is shown. The example plot may be a low power telecommunication tone with background white noise present. The line 200 represents a waveform being analyzed near the event DETECT_TIME. In the example shown, the circuit 130 may present a correct detection on the signal LOCK1. The signal LOCK2 also presents a logical high at the event time DETECT_TIME. A proper detection may occur by presenting the signal TONE_PRESENT at the output 112. The signal LOCK2 is shown transitioning from logical low to logical high around −50 milliseconds. The low-to-high transitions occur roughly in response to the rapid change of the edge of the signal POWER. The signal LOCK2 is shown transitioning from a logical high to a logical low around −30 milliseconds. The high-to-low transition is generated roughly in response to a rapid change of the edge of the signal POWER when the change does not last long enough to be considered a signaling tone.

Figure 10:
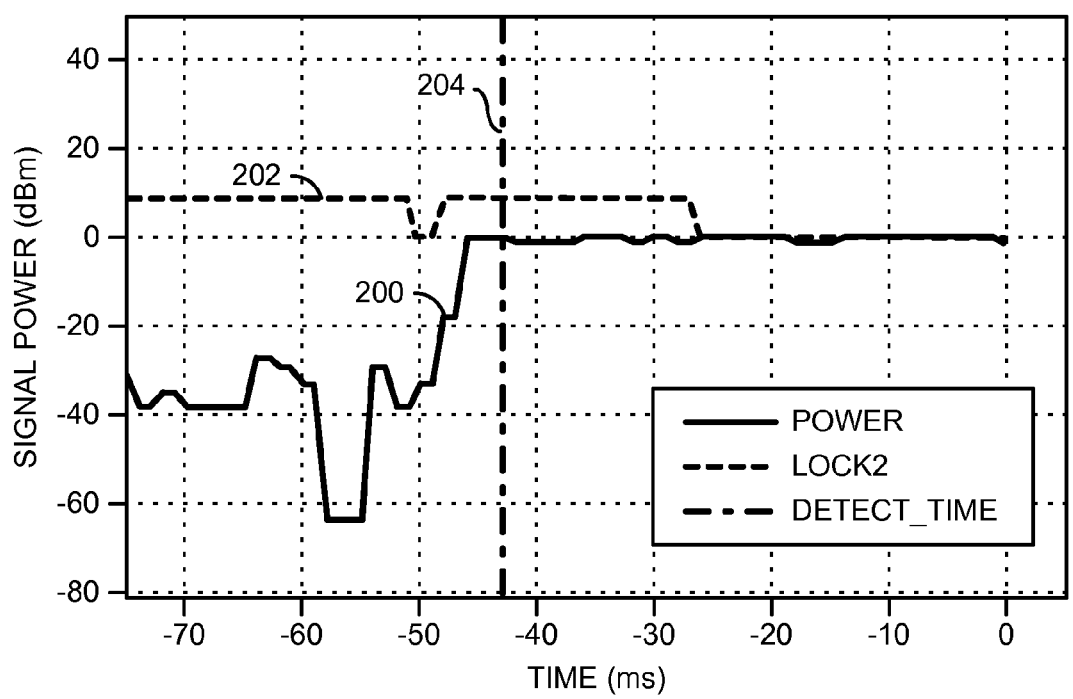

Referring to FIG. 10, an example plot of a frequency power waveform representing a real tone is shown. The example plot may be a higher power telecommunication tone than in FIG. 9 with background white noise present. The line 200 represents a waveform being analyzed near the event DETECT_TIME. In the example shown, the circuit 130 may present a correct detection on the signal LOCK1. The signal LOCK2 also presents a logical high at the event time DETECT_TIME. A proper detection may occur by presenting the signal TONE_PRESENT at the output 112. The signal LOCK2 is shown transitioning from logical low to logical high around −49 milliseconds. The low-to-high transitions occur roughly in response to the rapid change of the edge of the signal POWER. The signal LOCK2 is shown transitioning from a logical high to a logical low around −51 milliseconds and −28 milliseconds. The high-to-low transition is generated roughly in response to a rapid change of the edge of the signal POWER when the change does not last long enough to be considered a signaling tone.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

While the invention has been particularly shown and described with reference to embodiments thereof, it will be understood by those skilled in the art that various changes in form and details may be made without departing from the scope of the invention.

We claim:

1. A tone detection apparatus, comprising one or more integrated circuit to:
   receive an input signal and generate a power signal indicative of the input signal;
   generate a lock signal indicative of a rising edge of a frequency power envelope of the power signal; and
   generate a tone confirmation signal based on at least the lock signal.

2. The apparatus of claim 1, wherein the one or more integrated circuit comprises:
   a detector circuit to receive the input signal and generate the power signal;
   a processing circuit to receive the power signal and generate the lock signal, wherein the processing circuit is to generate the lock signal in response to a change in the power signal exceeding a predetermined power change threshold; and
   a decision circuit to generate the tone confirmation signal based at least on the lock signal.

3. The apparatus of claim 2, wherein the processing circuit is to:
   determine a change in the power signal between two consecutive signal sampling time windows; and
   output the lock signal in response to the change exceeding the predetermined power change threshold.

4. The apparatus of claim 3, wherein the processing circuit is to:
   determine a change in the power signal between three or more consecutive signal sampling time windows; and
   output the lock signal in response to the changes exceeding one or more predetermined threshold.

5. The apparatus of claim 3, wherein the processing circuit is to:
   compute a difference between a current power signal associated with a current sampling time window and a prior power signal associated with a previous sampling time window.

6. The apparatus of claim 5, wherein the processing circuit is to determine the current power signal is greater than the prior power signal if the power change exceeds 9 dB.

7. The apparatus of claim 1, wherein:
   the one or more integrated circuit further comprises a narrow band pass tone frequency filter to generate a filtered version of the input signal; and
   the one or more integrated circuit is to generate the power signal based on the filtered version of the input signal.

8. The apparatus of claim 1, wherein the one or more integrated circuit is further to:
   generate an additional lock signal in response to a filtered version of the input signal being above a predetermined power threshold; and
   generate the tone confirmation signal based on both the lock signal and the additional lock signal.

9. The apparatus of claim 8, wherein the one or more integrated circuit further comprises:
   a detector circuit including:
      a narrow band pass tone frequency filter to generate the filtered version of the input signal;
      a tone frequency power circuit to compute the power signal based on the filtered version of the input signal;
      a low pass filter to determine an average of the power signal; and
      a comparator to compare the average power signal with the power threshold, and output the additional lock signal in response to the average filtered input signal exceeding the power threshold.

10. A method for detecting a tone, the method comprising:
   receiving an input signal and generate a power signal indicative of the input signal;
   generating a lock signal indicative of a rising edge of a frequency power envelope of the power signal; and
   generating a tone confirmation signal based on at least the lock signal.

11. The method of claim 10, wherein the method further comprises generating the lock signal in response to a frequency change in the power signal exceeding a predetermined power signal change threshold.

12. The method of claim 11, further comprising:
determining a change in the power signal between two consecutive signal sampling time windows; and
outputting the lock signal in response to the change exceeding a predetermined threshold.

13. The method of claim 12, further comprising:
determining a change in the power signal between three or more consecutive signal sampling time windows; and
outputting the lock signal in response to the changes exceeding one or more predetermined threshold.

14. The method of claim 12, further comprising:
computing a difference between a current power signal associated with a current sampling time window and a prior power signal associated with a previous sampling time window.

15. The method of claim 11, outputting the lock signal in response to the current power signal being greater than the prior power signal by at least 9 dB.

16. The method of claim 10, further comprising:
band pass filtering the input signal; and
generating the power signal based on the band-pass filtered version of the input signal.

17. The method of claim 10, further comprising:
generating an additional lock signal in response to a filtered version of the input signal being above a predetermined power threshold; and
generating the tone confirmation signal based on both the lock signal and the additional lock signal.

18. The method of claim 17,
band-pass filtering the input signal;
computing the power signal based on the band-pass filtered version of the input signal;
low pass filtering the power signal to determine an average power signal;
comparing the average power signal with the power threshold; and
outputting the additional lock signal in response to the average power signal exceeding the power threshold.

19. A tone detection apparatus, comprising one or more integrated circuit to:
receive an input signal and generate a power signal indicative of the input signal;
generate a lock signal indicative of a rising edge of a frequency power envelope of the power signal;
generate an additional lock signal in response to a filtered version of the input signal being above a predetermined power threshold; and
generate the tone confirmation signal based on both the lock signal and the additional lock signal.

20. The apparatus of claim 19, wherein the one or more integrated circuit further comprises:
a detector circuit including:
a narrow band pass tone frequency filter to generate the filtered version of the input signal;
a tone frequency power circuit to compute the power signal based on the filtered version of the input signal;
a low pass filter to determine an average of the power signal;
a comparator to compare the average power signal with the power threshold, and
output the additional lock signal in response to the average filtered input signal exceeding the power threshold
a processing circuit to:
receive the power signal;
determine a change in the power signal between two consecutive signal sampling time windows; and
output the lock signal in response to the change exceeding the predetermined power change threshold; and
a decision circuit to generate the tone confirmation signal based on both the lock signal and the additional lock signal.

* * * * *